United States Patent
Keagy et al.

(10) Patent No.: US 6,665,427 B1
(45) Date of Patent: *Dec. 16, 2003

(54) APPARATUS AND METHOD FOR ELECTRONICALLY ACQUIRING FINGERPRINT IMAGE WITH LOW COST REMOVABLE PLATEN AND SEPARATE IMAGING DEVICE

(75) Inventors: John M. Keagy, San Francisco, CA (US); Naum Pinkhasik, San Jose, CA (US); Alexander Muzil, St. Petersburg (RU)

(73) Assignee: Identix, Inc., Minnetonka, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 537 days.

(21) Appl. No.: 09/255,744

(22) Filed: Feb. 23, 1999

Related U.S. Application Data

(63) Continuation of application No. 09/046,418, filed on Mar. 23, 1998, now Pat. No. 6,069,969, which is a continuation of application No. 08/308,098, filed on Sep. 16, 1994, now Pat. No. 5,732,148.

(51) Int. Cl.[7] .................................. G06K 9/00
(52) U.S. Cl. ................. 382/124; 382/127; 235/282
(58) Field of Search ................ 382/124–127; 356/71; 340/825.34; 902/5; 235/380, 382

(56) References Cited

U.S. PATENT DOCUMENTS

| | | | |
|---|---|---|---|
| 3,743,421 A | 7/1973 | Maloney | 356/71 |
| 3,781,855 A | 12/1973 | Killen | 340/146 |
| 3,824,951 A | 7/1974 | Le Vantine et al. | 118/31.5 |
| 3,861,142 A | 1/1975 | Leventhal | 261/124 |
| 3,864,042 A | 2/1975 | Leventhal | 356/71 |
| 3,873,970 A | 3/1975 | McMahon et al. | 340/146 |
| 3,959,884 A | 6/1976 | Jordan et al. | 340/146 |
| 4,003,656 A | 1/1977 | Leventhal | 340/146 |
| 4,120,585 A | 10/1978 | DePalma et al. | 356/71 |
| 4,258,994 A | 3/1981 | Task | 354/75 |
| 4,311,300 A | 1/1982 | Buerger | 256/1 |
| 4,336,998 A | 6/1982 | Ruell | 356/71 |
| 4,353,056 A | 10/1982 | Tsikos | 340/146.3 |
| 4,394,773 A | 7/1983 | Ruell | 382/4 |
| 4,428,670 A | 1/1984 | Ruell et al. | 356/71 |
| 4,429,412 A | 1/1984 | Pierce et al. | 378/165 |
| 4,455,083 A | 6/1984 | Elmes | 382/126 |
| 4,537,484 A | 8/1985 | Fowler et al. | 354/62 |
| 4,553,837 A | 11/1985 | Marcus | 356/71 |
| 4,577,345 A | 3/1986 | Abramov | 382/4 |
| 4,582,985 A | 4/1986 | Lofberg | 235/380 |

(List continued on next page.)

Primary Examiner—Yon J. Couso
(74) Attorney, Agent, or Firm—Fish & Richardson P.C.

(57) ABSTRACT

In one embodiment, a fingerprint sensing system includes a sheet prism having a sensing surface and a number of prismlets positioned opposite to the sensing surface. Each prismlet has an entrance surface and an exit surface, and is adjacent to another prismlet. The width of the sheet is more than ten times the maximum thickness of any one of the prismlets. When a finger is positioned on the sensing surface, a portion of the radiation entering a number of the entrance surfaces and incident at the sensing surface is reflected through total internal reflection. The reflected radiation emits from a number of the exit surfaces to create an image of the fingerprint. In another embodiment, the system further includes a second sheet prism stacked together with the previously described sheet prism. The second sheet prism has a flat surface and a number of prismlets positioned opposite to the flat surface, which faces the prismlets of the previously described sheet prism. The image formed with two sheet prisms can have lower distortion. In yet another embodiment, the fingerprint sensing system is incorporated into a flat-profile package using mirrors to fold radiation and to compress the height of the package.

11 Claims, 7 Drawing Sheets

U.S. PATENT DOCUMENTS

| | | | |
|---|---|---|---|
| 4,728,186 A | 3/1988 | Eguchi et al. | 356/71 |
| 4,784,484 A | 11/1988 | Jensen | 356/71 |
| 4,785,171 A | 11/1988 | Dowling, Jr. et al. | 250/227 |
| 4,792,226 A | 12/1988 | Fishbine et al. | 356/71 |
| 4,811,408 A | 3/1989 | Goldman | 382/115 |
| 4,811,414 A | 3/1989 | Fishbine et al. | 382/52 |
| 4,872,203 A | 10/1989 | Asai et al. | 382/4 |
| 4,876,725 A | 10/1989 | Tomko | 382/4 |
| 4,917,987 A | 4/1990 | Arudt et al. | 430/139 |
| 4,925,800 A | 5/1990 | Kovacs et al. | 435/240 |
| 4,932,776 A | 6/1990 | Dowling, Jr. et al. | 356/71 |
| 4,933,976 A | 6/1990 | Fishbine et al. | 382/4 |
| 4,936,680 A | 6/1990 | Henkes et al. | 356/71 |
| 4,944,021 A | 7/1990 | Hoshino et al. | 382/5 |
| 4,946,276 A | 8/1990 | Chilcott | 356/71 |
| 4,983,036 A | 1/1991 | Froelich | 356/71 |
| 4,983,846 A | 1/1991 | Rios et al. | 250/458.1 |
| 4,997,601 A | 3/1991 | Mirinni et al. | 264/29.2 |
| 5,088,817 A | 2/1992 | Igaki et al. | 382/125 |
| 5,126,882 A * | 6/1992 | Oe et al. | 359/40 |
| 5,177,802 A | 1/1993 | Fujimoto et al. | 382/124 |
| 5,210,588 A | 5/1993 | Lee | 382/124 |
| 5,210,797 A | 5/1993 | Usui et al. | 382/126 |
| 5,233,404 A | 8/1993 | Lougheed et al. | 382/127 |
| 5,241,606 A | 8/1993 | Horie | 382/126 |
| 5,283,475 A | 2/1994 | Berger | 307/141.4 |
| 5,402,324 A * | 3/1995 | Yokoyama et al. | 359/49 |
| 5,448,649 A | 9/1995 | Chen et al. | 382/126 |
| 5,448,659 A | 9/1995 | Tsutsui et al. | 385/14 |
| 5,528,355 A | 6/1996 | Maase et al. | 356/71 |
| 5,625,448 A * | 4/1997 | Ranalli et al. | 356/71 |
| 5,633,947 A * | 5/1997 | Sibbald | 382/124 |
| 5,732,148 A | 3/1998 | Keagy et al. | 382/124 |

* cited by examiner

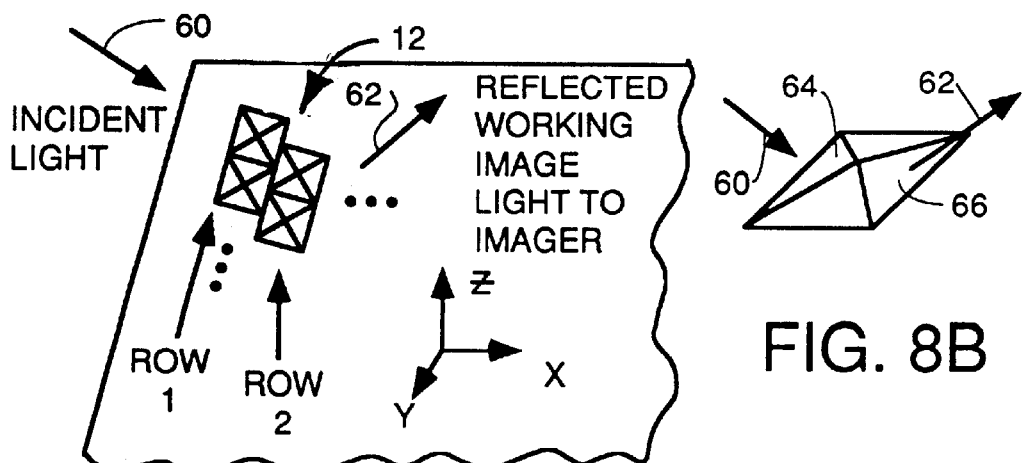
FIG. 8A
FIG. 8B
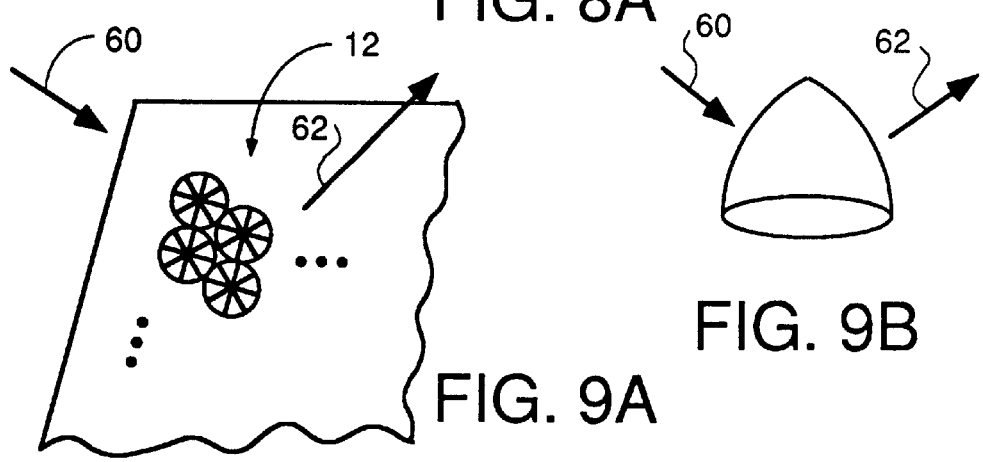
FIG. 9A
FIG. 9B
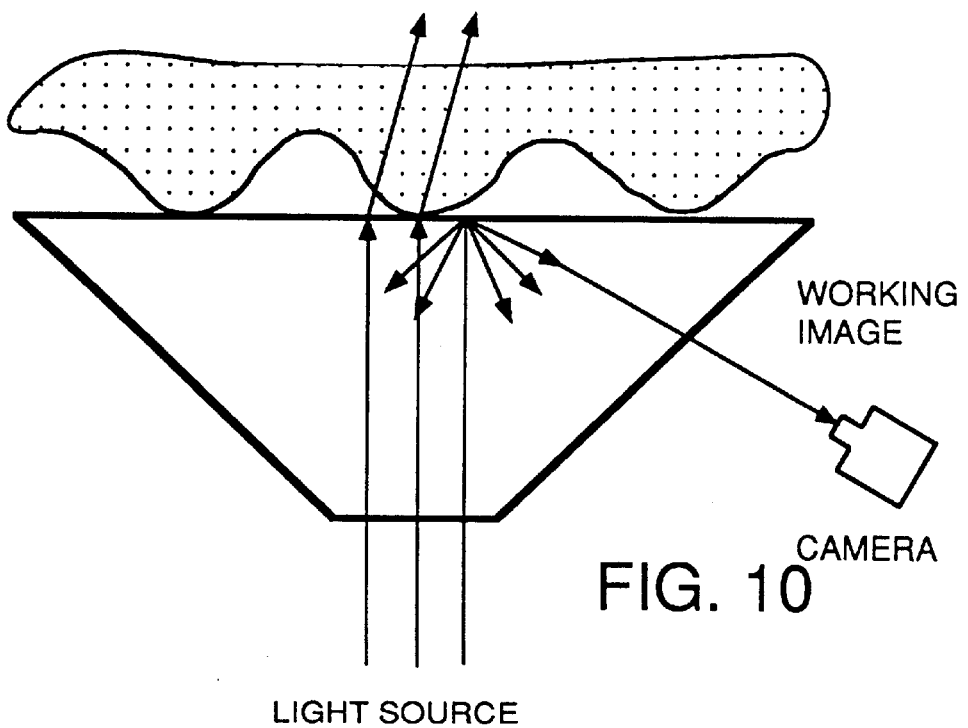
FIG. 10

APPARATUS AND METHOD FOR ELECTRONICALLY ACQUIRING FINGERPRINT IMAGE WITH LOW COST REMOVABLE PLATEN AND SEPARATE IMAGING DEVICE

RELATED APPLICATIONS

This application is a continuation of application Ser. No. 09/046,418 filed Mar. 23, 1998 now U.S. Pat. No. 6,069,969 which is a continuation of application Ser. No. 08/308,098, filed on Sep. 16, 1994, now U.S. Patent No. 5,732,148, issued Mar. 24, 1998.

BACKGROUND OF THE INVENTION

1. Field of the Invention

This invention relates to an apparatus and method for acquiring a high-resolution image of a person's fingerprint and more specifically to such an apparatus and method which utilizes a personal identification card with an integrated fingerprint platen that provides a high contrast fingerprint image when the identification card is placed on a direct fingerprint reader and a finger is placed on the platen.

2. Description of the Prior Art

Although there are other methods of identifying individuals, it has become readily apparent that fingerprints provide a unique and absolute means of identification that does not require cooperation from the subject.

Typically the fingerprint is acquired from the pad of the finger (or thumb) that extends from the tip of the digit to the first joint. The term finger, fingertip or fingerprint as used hereinafter is to be understood as including the thumb, thumb tip or thumb print, respectively. Ink or an inkless reagent is applied to the person's fingertips which are then rolled or placed flat on a clean recording surface, such as a fingerprint card, to deposit the ink or reagent on the surface in a pattern corresponding to the fingerprints of the person. Such prints are often blurred or smeared as a result of the flow of the ink and the rotation, displacement and distortion of the finger.

Electronic fingerprint acquisition systems (sometimes hereafter referred to herein as "direct fingerprint readers") have been introduced in recent times to eliminate the need for ink or a chemical reagent. In such systems, the subject's fingertip is pressed against or rolled over a flat transparent (e.g. glass) platen in an optical system. Light is directed through the platen and is reflected from the fingertip into an optical path including mirrors, lens and an electronic image sensor such as a CCD imager of the type employed in video cameras. The image of the fingerprint may be digitized, analyzed, printed out, stored, transmitted or compared with an existing fingerprint or fingerprints.

Fingerprint identification is an exacting science which requires the comparison of the many minute and unique characteristics of each fingerprint, including the pattern of ridge endings and ridge bifurcations and locations and directions of these features etc. (hereafter collectively referred to as minutiae) of each person's fingerprint. The total collection of minutiae collectively comprise a "signature" uniquely identifying the owner of the fingerprint. This signature will be hereafter referred to as a "template". Comparisons between the template of an unknown fingerprint and templates of fingerprints of known persons may be accomplished manually or by an electronic system. Regardless of the image capture method and regardless of whether the fingerprints are interpreted by a trained expert or by machine, the clarity of the print is obviously of paramount importance.

Unclear prints may be caused in chemical recording systems by (1) excessive pressure between the pliable fingertip and the flat recording surface resulting in a distortion of the fingerprint, (2) an uneven distribution of coating of the ink or other chemical (3) excessive or insufficient coating of the chemical, (4) improper movement of the finger on the card or (5) improper lifting of the finger from the card after it is rolled.

Unclear prints in the prior art electronic acquisition systems may be caused by (1) lack of contrast between the ridges and valleys, (2) interference caused by latent prints on the platen, (3) dirt on the platen resulting from use or environmental conditions, (4) scratches or other defects to the platen resulting from use, vandalism or environment conditions, (5) excessive pressure between the fingertip and the flat platen, (6) poor contact between the fingertip and platen resulting in a poor reflected image, (7) distortion caused by rolling the finger over the platen, (6) poor resolution of the fingerprint image or (7) gross distortion resulting from system configuration. Whatever the cause, an unclear print cannot be as accurately read or compared with an existing print for verification or identification purposes.

A plurality of electronic fingerprint acquisition systems have been proposed in the art for improving the fingerprint capture process. Many of these systems employ a transparent optical prism upon which the finger is placed. The prism is used to separate beams of light that impinge on fingerprint ridges from beams of light that encounter air in the valleys between fingerprint ridges at the surface of the prism to which the finger is applied. Such systems are exemplified by the following U.S. Pat. No. 4,876,725 [describing a fingerprint verification system for capturing a fingerprint image and optically processing it by spatially performing a Fourier transform using a card which includes a reflection hologram formed from the fingerprint of a known person—the intensity distribution or interference pattern that results indicates the presence or absence of a match]; U.S. Pat. No. 4,394,773 [teaching a fingerprint sensor using a flexible, piezoelectric polymer upon which surface charge distribution is rearranged in the presence of deformations in the polymer caused by fingerprint ridges—these charge distribution patterns are sensed with CCD devices]; U.S. Pat. No. 4,997,601 [electronic fingerprint recognition device wherein a finger placed on a platen is scanned ultrasonically by modulated sound waves which have first passed through and been modulated/filtered by a card containing an acoustic hologram of a known fingerprint—the reflected interference pattern acts as a correlation in determining the presence or absence of a match]; U.S. Pat. No. 4,582,985 [teaches a smart card identity verification system with an on-board platen upon which a finger of the user is placed, an on-board fiber optic scanning system an on-board matching circuitry to compare a bit pattern generated from the sensed fingerprint to stored bit patterns generated from fingerprints of persons of known identity]; U.S. Pat. No. 4,311,300 [teaching a flexible polymer sensor plate for fingerprint identification systems which works on the principle of total internal reflection of light rays that impinges on an air polymer interface such as is found in valleys between fingerprint ridges and escape of light rays without total internal reflection of light rays that impinge on deformations of the polymer caused by a ridge of a fingerprint]; U.S. Pat. No. 4,120,585 [teaching a prism based fingerprint image capture device using a compliant optical prism as a platen]; and U.S. Pat. Nos. 4,003,656 and 4,792,226 [teaching the conventional method in electronic fingerprint scanning devices of separating light rays that impinge on fingerprint ridges from rays that impinge on the air in valleys between fingerprint ridges because of the differences in indices of refraction at the respective interfaces].

Other electronic fingerprint acquisition systems of interest are described in U.S. Pat. No. 3,861,142 (Leventhal Feb. 4, 1975) and U.S. Pat. Nos. 4,120,858, 4,784,484, 4,258,994, 4,936,680. These patents relate to systems in which a combination finger platen and single prism is mounted in the fingerprint capture device. Additional related patents are: U.S. Pat. Nos. 4,983,846, 4,946,276, 4,933,976, 4,932,776, 4,925,800, 4,917,987, 4,784,484, 4,577,345, 4,553,837, 4,537,484, 4,429,412, 4,428,670, 4,258,994, 4,120,585, 1,103,656, 3,959,884, 3,861,142, 3,824,951).

Several systems have been proposed which do not employ a prism, but instead employ a fiber bundle. Two such systems are described in U.S. Pat. No. 4,785,171 (Dowling, Jr. et al. Nov. 15, 1988) and U.S. Pat. No. 4,932,776 (Dowling, Jr. et al. Jun. 12, 1990). In these systems, the finger is placed onto a optical fiber bundle as opposed to a prism. The finger platen is a specially prepared surface of the fiber bundle. The fiber optic bundle has an angled surface which serves as an integral platen for an electronic fingerprint acquisition system. Image formation is based upon the principles taught in U.S. Pat. Nos. 4,003,656 and 4,792,226. The finger platen is a permanent part of the fiber bundle and is an integral part of the assembly.

Regardless of the design of the assembly for capturing fingerprint images electronically, the prior art consistently employs a costly finger platen that is integrated into the device. Some designs allow for the prism and finger platen to be replaced periodically, which is necessary when the finger platen no longer provides optimum quality fingerprint images due to dirt or defects from use and/or abuse. The replacement of the prism and finger platen is costly and time consuming and may require special training and tools. Vendors often provide a replacement prism with their prior art fingerprint imaging device and some vendors offer programs to factory recondition prisms and finger platens.

The large variety of prior art devices for capturing fingerprint images all have a common problem—platen maintenance. It is a completely natural and unavoidable occurrence that oils and dirt accumulate with use of the device. Many platens have slightly tacky polymer surfaces or coatings which are designed to improve the optical contact and resulting image contrast. Environmental conditions such as blowing dust and misuse or vandalism in unattended application can also contribute to a build-up of dirt, grease or damage on the surface of the finger platen that obscures the fingerprint images.

A plurality of approaches have been employed to combat this problem. Coatings on the platen surface have been developed to improve the optical contact between the finger and the platen. Prior art units are also typically shipped from the manufacturer with solvents and materials for cleaning the platen surface and instructions for cleaning the unit regularly.

No prior art unit has completely eliminated the need for periodic maintenance of finger platens. This requirement for regular maintenance of the finger platen makes it challenging to install a prior art electronic fingerprint device in environments where it will not be attended by a service technician. With prior art systems with fixed or integral platens, a person still needs to regularly attend to the unit and clean the platen when necessary which makes these prior art systems inconvenient and expensive to used in unattended situations. Examples of typically unattended applications are: physical access control such as prisons and security checkpoints and payment systems such as automated bank tellers.

A fingerprint capture device installed outdoors is subject to weather and may also be used by people with dirty fingers. If one person with sweaty, greasy or dirty fingers uses the unit, the platen may be obscured and the unit may be rendered both unuseable and unappealing to the next person to use the unit.

Thus, there has arisen a need for a system to capture fingerprint images that minimizes platen maintenance and provides high quality fingerprint images.

SUMMARY OF THE INVENTION

An apparatus for electronically acquiring fingerprints in accordance with the present invention includes a fingerprint imaging device without a finger platen, and a separate finger platen integrated into a card, such asa personal identification or credit card. Hereafter, the platen integrated onto the personal identification card or credit card may be referred to as the Personal Platen™. The card with finger platen is inserted by each user into the fingerprint imaging device to complete the system for capturing fingerprint images. The finger is placed onto the platen on the card and a high quality fingerprint image is captured by a camera in the fingerprint imaging device. A user places his or her finger on the top side of the platen portion of the identification card. The underside of the platen portion of the identification card faces a light source and imaging optics. The underside of the finger platen on the card has an optical surface that improves the contrast of the fingerprint image by separating light rays that impinge on portions of the platen touching a finger print ridge from light rays that impinge on air in the valleys between fingerprint ridges or air at the ends of ridges that terminate. This optical surface can have any configuration that can cause the aforementioned separation. One configuration that works especially well is a series of "microprisms" in the form of parallel lines of tiny triangular shaped ridges. This configuration contains many small prisms instead of one large prism as found in the prior art and renders the platen according to the invention thin and portable and especially well suited for carrying in a wallet as part of a credit card. Another optical surface that works well to separate the light rays falling on ridges from light rays falling on spaces around ridges is a diffraction grating. Other configurations for the optical surface may include arrays of tiny Fresnel lenses or arrays of tiny pyramids.

Not all the above configurations have been successfully tested as of the filing date of this application. To the extent any of these configurations are inoperative, they are excluded from the scope of the invention defined in the appended claims and equivalents thereof.

The platen according to the teachings of the invention can be made at a sufficiently low cost that it can be used in a disposable fashion or as a separate device which can be distributed to each individual user.

BRIEF DESCRIPTION OF THE DRAWINGS

FIGS. 8A and 8B are views of an alternative optical surface using pyramids.

FIGS. 9A and 9B are perspective views of another optical surface embodiment using cones.

FIG. 10 is an enlarged view of another alternative type shape for the optical surface comprising a truncated prism.

DETAILED DESCRIPTION OF THE PREFERRED EMBODIMENT

Figure 1:
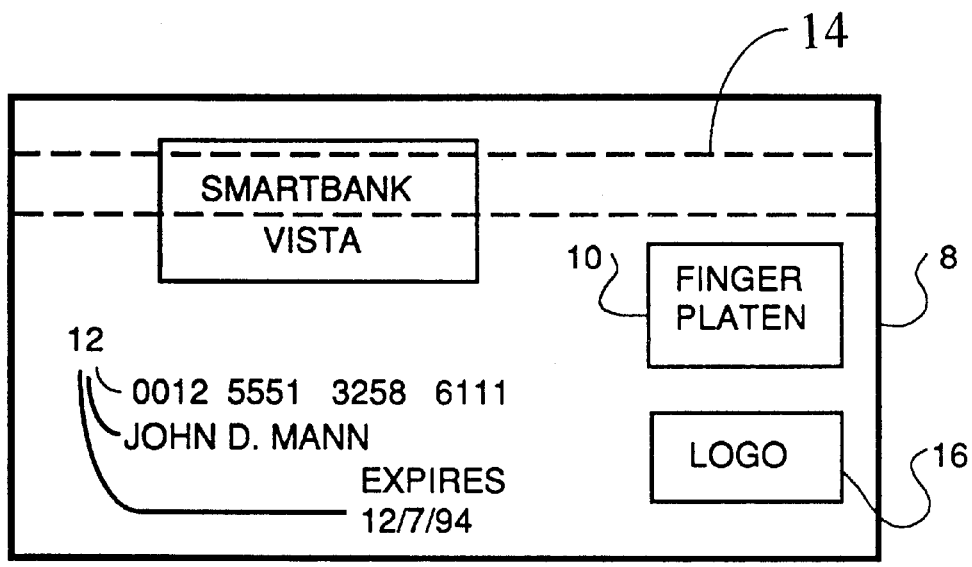
FIG. 1 is a top view of a card with integrated finger platen in accordance with the present invention.

Referring now to FIG. 1, there is shown a personal identification card or credit card 8 with an integrated Personal Platen™ 10 which will be hereafter referred to as finger platen 10. The identification card or credit card is typically 0.5 mm thick acrylic or PVC. The finger platen is transparent plastic area which may be located anywhere on the card which does not interfere with the embossed printing 12 on the front side of the card or the magnetic stripe 14 on the backside of the card (shown in dashed lines). One especially useful location for the finger platen is on the edge of the card where easy access is provided to the fingers once the card is placed in or on the fingerprint imaging device (not shown). However, the finger platen 10 may be located on any section of the card where it won't interfere with other elements of the card, such as a magnetic strip 14, card sponsor text 15, hologram/logo 16 or photo. Typically, the size and placement of the various elements on the credit card are defined by ISO standards or other national standards, so the placement of the finger platen is preferably positioned so as to be compatible with the prevailing national standards.

The finger platen 10 can be any size from a minimum size necessary to encompass at least enough of a fingerprint to provide sufficient data for verification or identification to a statistical certainty up to about 1.0 square inches. A finger platen 10 in the above noted size range is suitable for flat impressions of fingerprint ridges. The finger platen may be significantly larger (1.0 to 10.0 square inches) for capturing rolled impression fingerprints, palm prints or impressions of multiple fingers although these larger sized applications would not be suitable for an identification card or credit card to be carried in a wallet and therefore may not be incorporated into a card. The finger platen 10 may in fact be made to much larger dimensions, e.g., 10.0 to 100.0 square inches, for capturing much larger images, such as friction ridges of palms and feet. The finger platen 10 is sufficiently thin (less than 2 mm), light weight (less than 5 grams) and inexpensive (less than $0.25) to be incorporated into a card for carrying in the wallet. In some embodiments, the finger platen 10 may be a separate disposable item carried in the wallet of the user.

In the preferred embodiment, the finger platen 10, including the optical surface 12 to be discussed below is formed by an inexpensive plastic forming process such as heat stamping or injection molding. In some embodiments, the finger platen 10 is wide enough to be used for rolled fingerprint impressions. In some embodiments, the finger platen is larger than a credit card and is large enough to capture ridge impressions on feet or palms.

Figure 2:
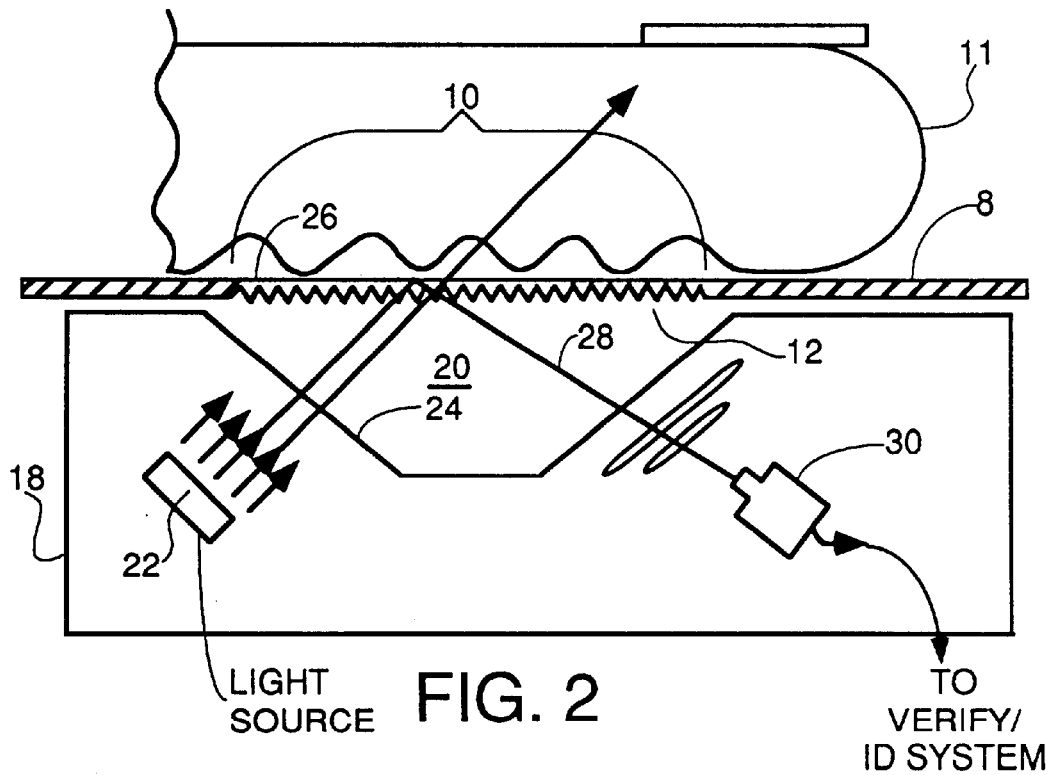
FIG. 2 is a side view of the fingerprint capture system showing a finger placed on the card with finger platen that has been inserted into the direct fingerprint reader.

Referring to FIG. 2, there is shown a symbolic view of a typical direct fingerprint reader with removable platen. The direct fingerprint reader is comprised of a chassis 18 which is typically permanently installed in a location needing access control or identity verification such as an automated teller machine. The credit card 8 is placed on or inserted into the direct fingerprint reader such that the finger platen portion 10 is located over an imaging area 20 and one or more fingers 11 can be placed on the finger platen 10. An incoherent light source 22 supplies light rays directed into the imaging area through a protective, transparent glass or plastic dust barrier 24. These light rays strike an optical surface 12 formed on the underside of the finger platen 10. The purpose of this optical surface is to prevent reflections from the underside of the finger platen which would interfere with light rays reflected from the upper surface 26 of the finger platen which form the "working image" of the fingerprint. The light rays of the working image, symbolized by single light ray 28, are reflected from the top surface 26 of the finger platen and pass through transparent dust barrier 24. From there, they pass through a series of lens and/or mirrors in an optical path between the top surface of the finger platen and an imaging device 30. Typically, the imaging device is a CCD imaging integrated circuit with associated scanning circuitry such as is found in video cameras. The imaging device collects light rays from the working image. Photons from these light rays alter charge distribution within an array of pixel locations on the surface of the charge coupled device. This changed charge distribution is sensed in a raster scanning process and is used to an output video signal in which the working image of the fingerprint is encoded. This output video signal is then digitized and the minutiae of the fingerprint image automatically located, mapped and recorded as a form of electronic "signature". This "signature" may then be compared to similarly generated electronic signatures called templates from persons of known identity stored in a database for purposes of verifying that a user's true identity matches the identity of the person he or she "says" she is by virtue of presentation of the card to the DFR. This verification or identification process can be performed by any of the known apparatus and methods described in the prior art and does not form part of the teachings of the invention.

The working image is generated by a "filtration" process which separates light rays that fall upon fingerprint ridges from light rays that fall upon the air in valleys between fingerprint ridges and elsewhere where the fingerprint does not contact the finger platen 10. This filtration process is best understood by reference to FIG. 3 which is a ray diagram detailing the formation of the working image in the presence of a finger platen having an optical surface according to the teachings of the invention. The finger platen 10 is typically made of transparent, flexible plastic for applications where the credit card or identification card 8 is to be carried in a wallet and is subject to flexing. Where this is not the case, glass or other brittle, transparent materials can be used. The preferred plastic material is any plastic that can be pressure formed at high temperature or injection molded to have five or more prisms per millimeter. The preferred density of optical structures is at least 50 structures per millimeter, and generally, higher density structures work better. The preferred shape for the optical surface 12 is shown in FIG. 4 and is comprised of parallel rows of tiny triangular prisms placed edge to edge such as prisms 32 and 34 in FIG. 4. The preferred width at the base of each prism is 200 microns, and the preferred angle beta ( beta) is 90 degree(s).Generally, the sharper the point at the apex of angle beta, the better is the contrast in the working image, but in alternative embodiments, a prism shaped like prism 36 will also probably work although not as well. In other alternative embodiments, other angles beta which are either more or less than 90 degree(s) will also work. Selection of the angle beta depends upon the angle theta θ a of the incident light rays such as ray 38 and the relative indices of refraction of the material of the finger platen 10 and the medium (usually air) in which it resides. It is desired that the optical surface 12 be shaped such that the incident rays from the light source are not reflected from the optical surface 12 and pass therethrough to reach the interface surface 26 between the top of the finger platen 10 and the finger 11 of the user. For this condition to be true, the incident light must impinge on the optical surface at an angle less than the critical angle defined by Snell's law. Snell's law states:

$$\sin\Phi_{crit} = \frac{n_b}{n_a}$$

where $n_b$ =the index of refraction of the medium above the interface surface 26 (air=1.0), and $n_a$ =the index of refraction of the medium below the interface surface 26 (plastic), and $\Phi_{crit}$=the critical angle of total internal reflection wherein the angle of refraction is equal to 90°, i.e., the refracted ray does not leave the plastic and entering the air but is refracted at an angle so as to travel parallel to the top surface 26 of the finger platen.

Figure 5:
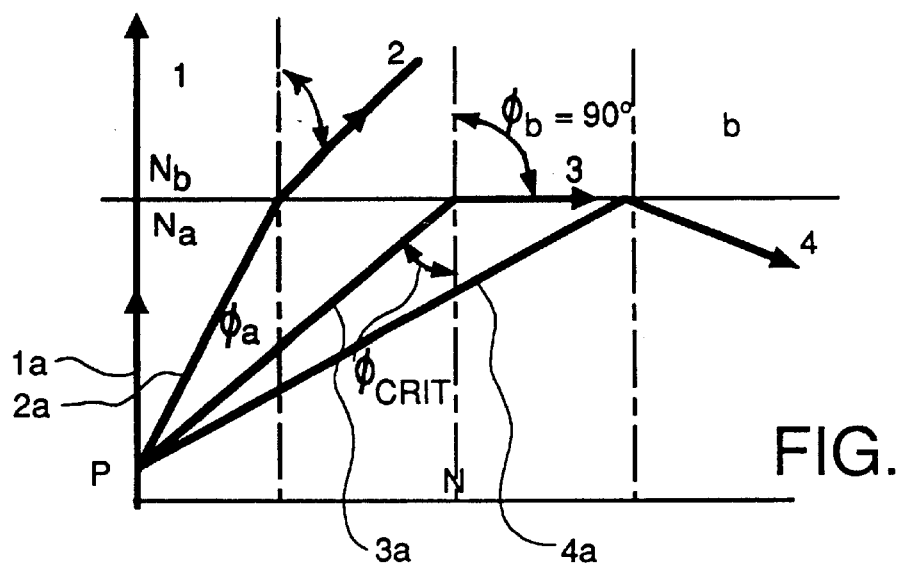
FIG. 5 is a further ray diagram explaining total internal reflection.

FIG. 5 is a ray diagram illustrating the various angles discussed above. Rays 1*a* and 2*a* pass out of medium a into medium b because the angle of incidence $\Phi_a$ at the interface between medium a and medium b is less than the critical angle. However, rays 3*a* and 4*a* are totally internally reflected because their incidence angles relative to normal N to the interface equal or exceed the critical angle.

Figure 3:
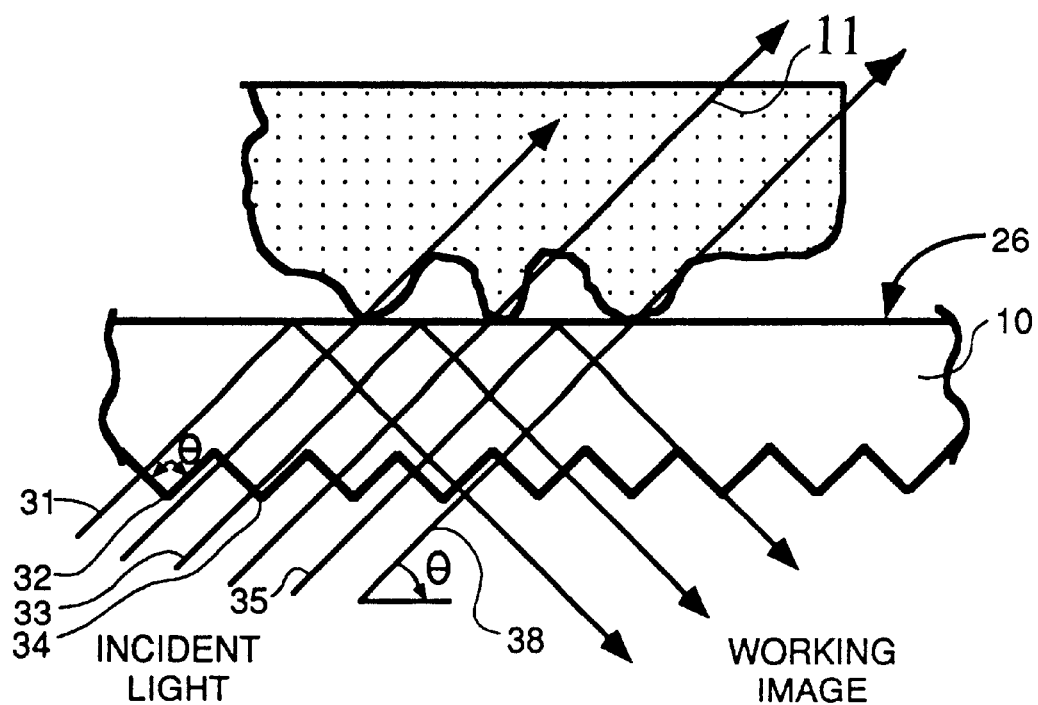
FIG. 3 is an optical ray diagram showing how the working image is formed.
Figure 4:
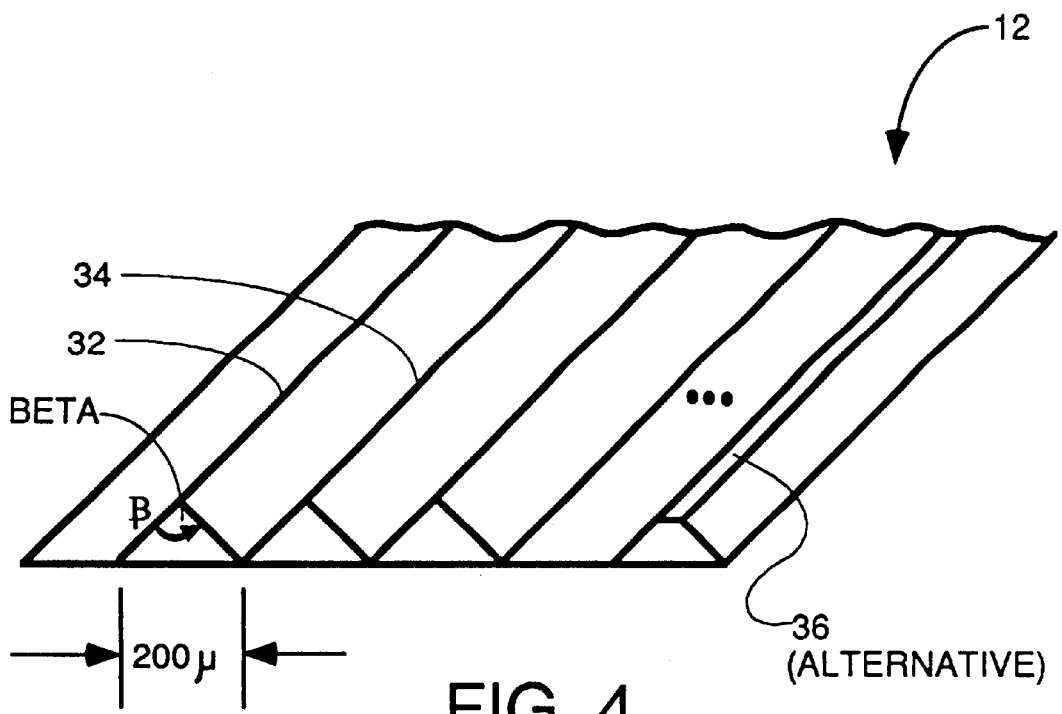
FIG. 4 is a perspective view of the preferred optical surface comprised of parallel rows of microprisms.

In FIG. 3, because of the difference in the indices of refraction between air and flesh, rays that impinge on air in the valleys between fingerprint ridges, such as rays 31, 33 and 35, are totally internally refracted and proceed back down through the optical surface to form the rays of the working image. The remaining rays which impinge upon the flesh of fingerprint ridge, pass out of the plastic of the platen 10, enter the flesh and escape thereby forming a contrast in the working image between the ridges and surrounding valleys of the fingerprint.

Figure 6:
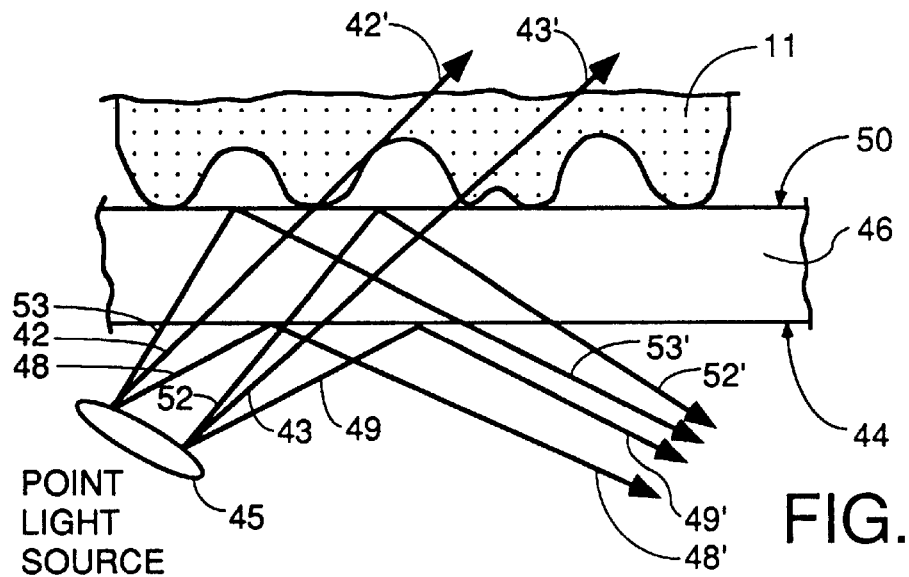
FIG. 6 is a ray diagram illustrating the problems that are encountered is no optical surface is used on the underside of the Personal Platen.

A situation which the presence of the optical surface 12 negates is shown in FIG. 6. This figure is a ray diagram illustrating how the absence of an optical surface can lead to loss of the working image by interference with rays reflected from the undersurface of the finger platen. In FIG. 6, rays 42 and 43 emanates from a point light source 45 at angles such that they pass through the bottom surface 44 of the plastic platen 46 and reach the upper interface surface 50. These rays 42 and 43 happen to fall upon points on upper surface 50 in contact with ridges of a finger, and escape the platen and are lost as rays 42' and 43'. In contrast, rays 52 and 53 reach the top surface and impinge upon air in the valleys between fingerprint ridges, and are totally internally reflected. Their reflected versions, 53' and 52', form part of the white portions of a working image of the user's fingerprint. Rays 52' and 53' are refracted toward the imaging apparatus(not shown) because of the difference in indices of refraction between the flesh in a fingerprint ridge and air.

The problem is that the contrast of the working image is reduced or destroyed by the rays that are reflected from the flat undersurface 44 such as rays 48 and 49. These rays emanate from the point source at angles that are less than the critical angle and are reflected back toward the imaging device. Since these rays carry no information about the image of the fingerprint, they only reduce the contrast in the working image or destroy the working image altogether.

Figures 7A, 7B:
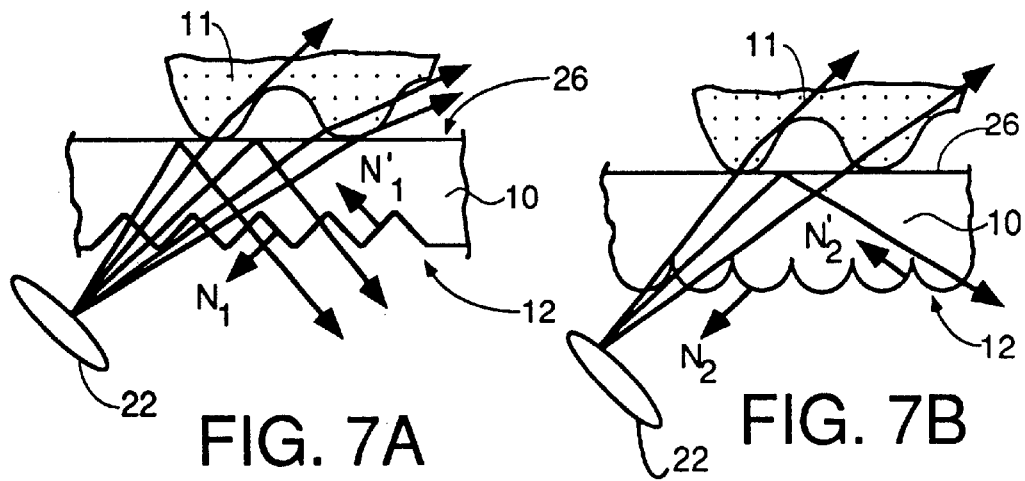
FIGS. 7A and 7B are ray diagrams explaining formation of the working image with the preferred optical surface and an alternative optical surface.

The optical surface 12 according to the teachings of the invention must have a configuration which avoids the problem illustrated in FIG. 6. Referring to FIG. 7, comprised of FIGS. 7A and 7B, the manner in which the optical surface overcomes the problem illustrated in FIG. 6 can be better understood. The optical surface 12 has a plurality of adjacent "optical structures" formed thereon. For purposes of defining the invention in the claims, the term "optical structure (s)" means any structure on the underside of the finger platen that serves to eliminate the reflection from the underside of the finger platen of non-working rays, i.e., rays that bear no information about the working image such as rays 48 and 49 and their reflected counterparts 48' and 49' in FIG. 6. To do this, the optical structures should be configured such that a normal N to the optical surface 12 at the general area on each "optical structure" where incident light from the light source 22 arrives points generally toward the light source. This virtually guarantees that the angle of the arriving rays relative to the normal N will have an incidence angle less than the critical angle and will pass through the optical surface unreflected and continue to travel toward the upper surface 26 of the finger platen. Two such normals are indicated in FIGS. 7A and 7B as vectors $N_1$ and $N_2$.

After passing through the optical surface 12 from the bottom, the rays that impinge on points of the surface 26 in contact with air in valleys surrounding fingerprint ridges are totally internally reflected while rays that impinge on points of the surface 26 in contact with ridges of the fingerprint will not be reflected and will escape from the plastic of the finger platen 10 and be dissipated.

To prevent loss of the rays of the working image reflected from the upper surface 26, the "optical structures" should have a configuration such that the normal to the surface of the optical structures impinged upon by the rays reflected from the portions of the top surface 26 point generally toward the top surface 26 at generally the same angle to the top surface 26that the reflected rays have. Two such normals are illustrated as vectors $N_1$ and $N_2$ in FIGS. 7A and 7B, respectively. Of course there area range of angles for these normals $N_1$ and $N_2$ that will cassette rays reflected from the top surface 26 to arrive at optical surface 12 with angles to these normal $N_1$ and $N_2$ which are less than the critical angle. The same general concept is true for the normals $N_1$ and $N_2$. So long as shape of the optical structures is such that the rays arriving from the light source 22 and the reflected rays from surface 26 arrive at the optical surface with angles of incidence which is less than the critical angle in each case, the optical structure will be within the teachings of the invention.

Most plastics that are transparent can be used for the finger platen 10. The preferred optical surface is illustrated in FIG. 4 as parallel rows of microprisms, however, other optics, such parallel rows of semicircular Fresnel type lens such as are illustrated in FIG. 7B may be substituted.

FIGS. 8A and 9A show other alternatives for the optical surface 12. FIG. 8A shows optical surface 12 in perspective as an array of tiny pyramid-shaped prisms arranged in staggered rows. Incident light from light source 22 is represented by vector 60 and reflected light from the fingerprint ridges forming the working image is represented by vector 62. FIG. 8B shows a close-up perspective view of one pyramid. The angles at the apex of the pyramid should be such that the normal to the surface 64 generally points toward the light source 22 (not shown), and the normal to the surface 66 points generally parallel to a light between the imaging device (not shown) and center of the area of contact between the finger and the opposite "top" surface 26 shown in FIGS. 7A and 7B. This prevents reflection from the surfaces 64 and 66 so long as the angle between the normals and the incident and reflected light do not equal or exceed the critical angle. The surfaces 64 and 66 may be flat or slightly curved. Row1 in FIG. 8A is offset by ½ of a pyramid from row 2 along the Y-axis such that incident light passing between the pyramids of row 1 impinge on the surfaces 64 of the pyramids in row 2 FIGS. 9A and 9B show another alternative structure for optical surface 12. The optical surface of FIG. 9A is comprised of an array of tiny cones in staggered rows like the staggered rows of pyramids of FIG. 8A. FIG. 9B shows one of the cones in close-up perspective. Again the apex of the cone should have an angle such that the normals to the surface areas illuminated by incident light 60 and reflected light 62 are roughly parallel to vectors 60 and 62.

Diffraction grating type optical surfaces 12 have also been found to work.

The physical characteristics of the optical surface have been exaggerated in the above described figures for illustrative purposes as the actual size of the optical devices in the array on the optical surface 12 is quite small. The optimal density of optical devices is approximately 50 devices per millimeter or higher. This is a sufficient density of optical devices that individual devices are not noticeable in the fingerprint images when they are inspected at a standard resolution of 500 pixels per inch. The density is also low enough that the optical devices can be made conveniently at a low cost.

The manufacturing process is simple and low cost and involves either a heated molding stamp which is stamped into an inexpensive piece of transparent plastic (hereafter referred to as hot stamping). In the alternative, the optical surface may be formed by injection molding. For cardholder identification purposes, the plastic piece can then be used in the assembly of a plastic card, or the plastic card itself may have a transparent plastic area integrally formed therein which is subjected to hot stamping to form optical surface 12. Alternatively, the entire credit card or identification card including the optical surface 12 can be formed by injection molding and later printed and embossed as necessary with cardholder and logo information.

Please note that only one suitable location for light source 22 and imaging device 30 has been illustrated in the FIG. 2. The placement of the light source and camera can be changed substantially and still provide high contrast images. FIG. 10 is an enlarged view of an alternative truncated prism shape for the individual prisms of the optical surface 12. The operation of a finger platen having an optical surface comprised of parallel row of microprisms shaped like that shown in FIG. 10 and having a density of at least 50 such rows per millimeter is as shown. Light rays from a light source placed directly beneath the optical surface strike various points on the imaging surface of the platen some of which are in contact with air and some of which are in contact with flesh. The rays that first encounter the flesh of a ridge are internally reflected and make up the rays of the working image. The rays that first encounter the air in valleys around a fingerprint ridge escape the platen and are lost thereby forming the contrast in the working image.

The fingerprint imaging device illustrated in the figures is novel in that it does not have an integrated finger platen.

Figure 11:
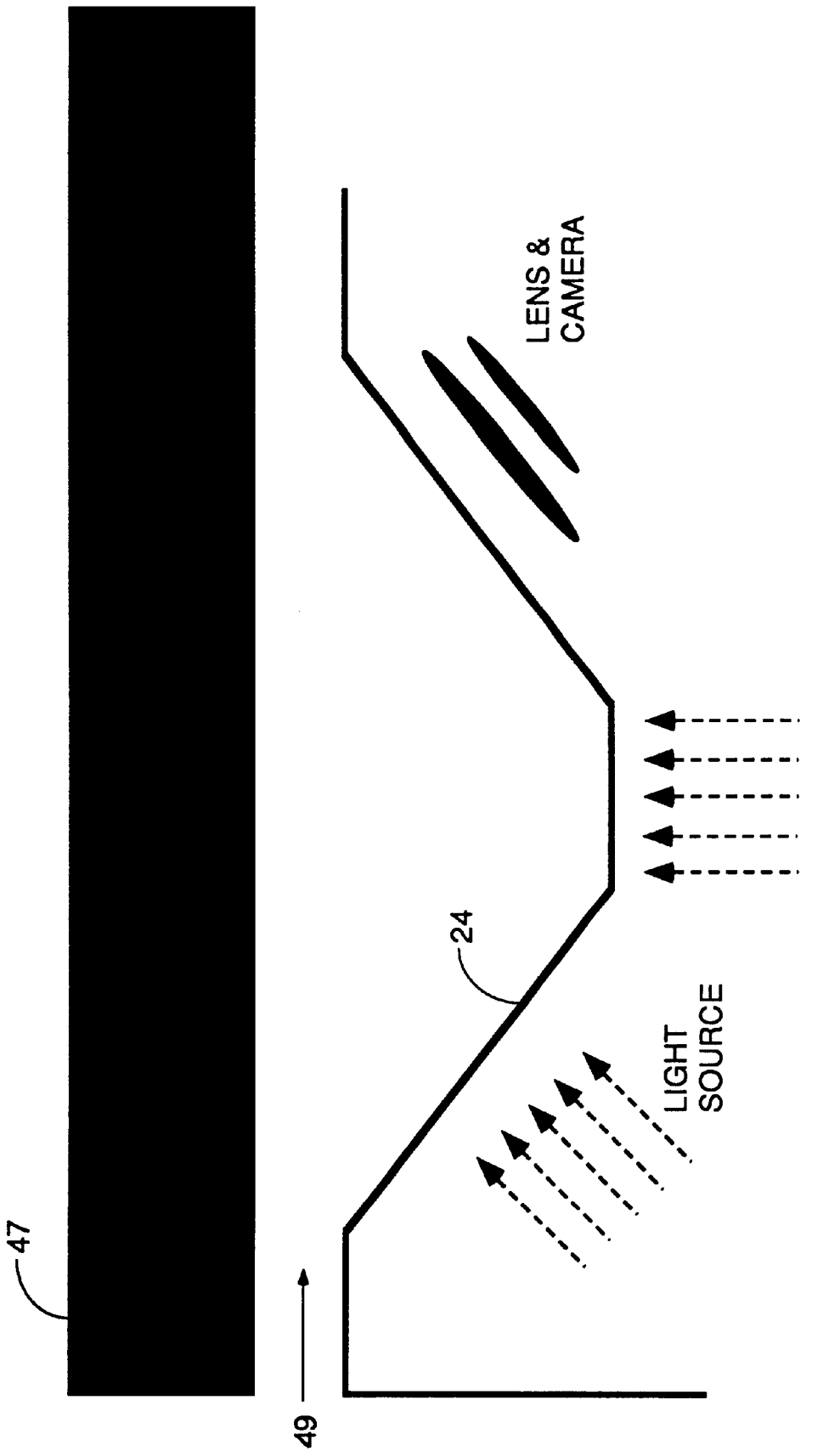
FIG. 11 is a view of an embodiment using a retractable cover showing the cover in the closed position.
Figure 12:
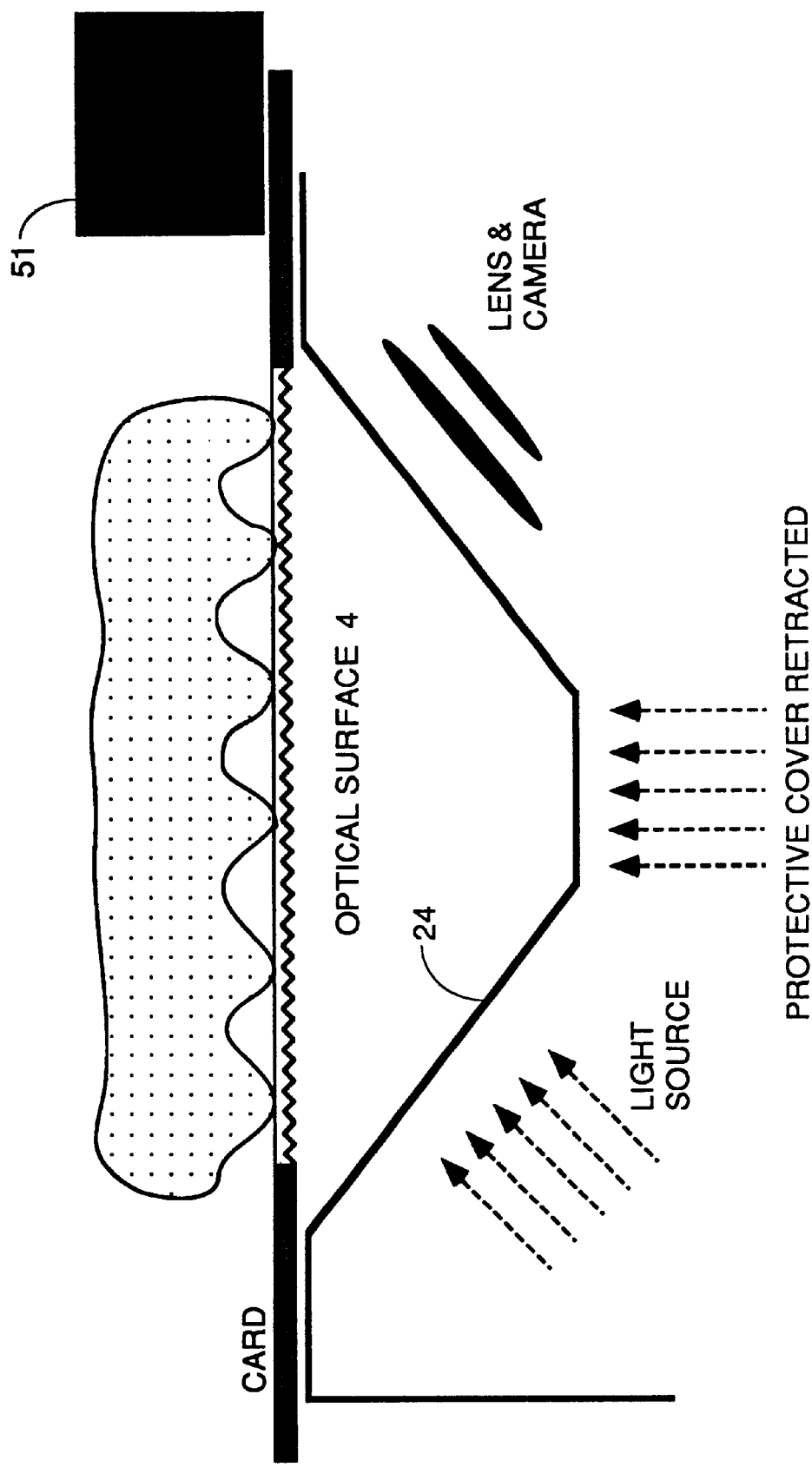
FIG. 12 is a view of an embodiment using a retractable cover showing the cover in the retracted position.

Optionally, any of the fingerprint imaging devices described herein may have a retractable cover 47 as shown in FIG. 11 which shows the DFR with the protective cover in place and the card not inserted. When a card with integrated finger platen is inserted into a card slot 49, the cover retracts to the position 51 shown in FIG. 12. Optionally, the validity of the card may be determined before the cover is retracted. This cover protects the transparent housing/dust shield 24 that protects the light source and lens and camera. This transparent housing/dust shield does not serve as an optical component in the system other than as a dust shield. The dust shield remains free of dirt because it is constantly covered by either the retractable cover 47 or the card with integrated platen. Because the transparent housing 24 is within the focal length of the lens system, and because it is at right angles to the illumination and imaging beams or at least the imaging beams, any dirt etc. that may accumulate on the housing have a minimal effect in obscuring the fingerprint images.

Figure 13:
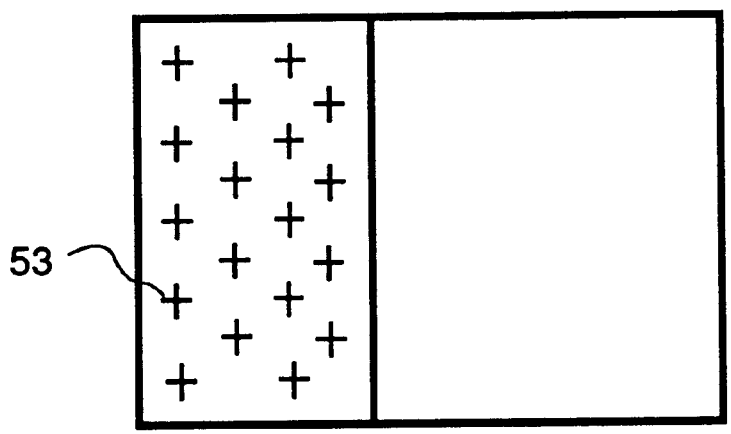
FIG. 13 is a view of a Persona Platen with an appended two dimensional bar code encoding the template of the fingerprint of the rightful owner of the card.

Optionally, the card with integrated platen illustrated in FIG. 1 may be coded with information regarding the cardholder's fingerprint. This information may be encoded on a magnetic stripe, chip, or optically printed in code on the underside of the card. Such an optical code, such as a multi-dimensional bar code, may be printed on the bottom side of the card or on the transparent finger platen itself. Multi-dimensional bar codes are known and the teachings of the prior art on this topic are incorporated by reference herein. Optically printed code can be recorded by the same camera used to image fingerprints as illustrated in FIG. 13. Typical CCD imaging devices have a 3×4 aspect ratio, i.e., about 500 pixels by 700 pixels. Since the typical need for a fingerprint platen is a square shape which only need be 500 by 500 pixels, there is an unused area in the image which is 500 by 200 pixels. This is more than enough pixel capacity to encode template data identifying the unique characteristics of the rightful owner's fingerprint. This template data can be encoded in the 500×200 pixel area as a two-dimensional bar code or any other form of spatially encoding digital data. The excess capacity in the image sensitive area of the imager is then used to sense the two dimensional bar code or other spatial encoding of the template data (hereafter referred to as two dimensional bar code regardless of the actual spatial encoding scheme selected) represented by the crosses shown at 53. These two dimensional bar code patterns can encode the "template" of the rightful owner's fingerprint, or, in more secure embodiments, an enciphered version of the template. As is well known to those skilled in the art, the template is a digital representation of the x, y and theta data on the collection of minutiae which uniquely characterize each fingerprint. The image of the two dimensional bar code maybe decoded to yield the x, y and theta information of the rightful owner, and this data is then compared to x, y and theta information of minutiae extracted from the live fingerprint to verify identity of the user. Typical template data files for identification are only 500 bytes in length, and for verification only, the template can be as short as 100 bytes of data. The preferred. 2-D bar code scheme for encoding template data as a two dimensional pattern is PDF 417 which is commercially available from Symbol Technology.

Known cipher algorithms such as Veritas from Pitney Bowes, PGP or the National Bureau of Standards DES algorithm may be used to encode the template data into an enciphered data collection which is then converted to a two dimensional bar code. The user could enter the deciphering key in a keypad (not shown) on the outside of the DFR. PGP (Pretty Good Privacy™ encryption of the template data would be used as follows. The digital template data file encoding the minutiae data of the rightful owner of the card would be compressed by the PGP program prior to encryption. The PGP program would then encrypt the compressed file by automatically creating a session key and using that to encrypt the file. The session key would then be encrypted with the public key of the rightful owner. The encrypted file, including the encrypted session key, would then be encoded into the spatial pattern on the card. The rightful owner has both a public key which can be revealed in the clear and a private key which should never be revealed to anybody. The rightful owner's public key and private key are two halves of the same key which are mathematically related such that anything encrypted with the public key can be decrypted using only the private key. The preferred encryption scheme is Veritas available commercially from Pitney Bowes.

The spatial pattern on the personal platen encoding the encrypted template data, the encrypted session key and the public key must first be decoded in the DFR to go from spatial encoding back to a digital representation of the encrypted file. After this is done, the encrypted file would be decrypted using the rightful owner's private key to recover the session key. The session key would then be used to decrypt the template data and the DFR would then used the template data to compare to the live fingerprint. PGP can be purchased from Via Crypt of Phoenix, Ariz. and is described in U.S. Pat. Nos. 5,214,703, 4,200,770, 4,218,582, 4,405,829 and 4,424,414 all of which are incorporated by reference.

Different light sources may be utilized to illuminate the optical code than are used to image fingerprints.

Although the invention has been described in terms of the preferred and alternative embodiments disclosed herein, those skilled in the art will appreciate various substitutions which may be made for various elements in the disclosed embodiments which do not alter the basic functionality of each element and the functional interaction between the elements. For example, in one preferred embodiment, surface 26 of the platen is coated with a clear rubber polyurethane or silicone layer of hardness 60–70 Shore A and approximately 0.5 millimeters thick. This layer improves the optical contact and the fingerprint resolution image. In addition, certain other modifications may also be appreciated with do not alter the basic principle of operation and the interplay and functional interdependency of the combined elements. All such modifications and substitutions are within the scope of equivalents under the doctrine of equivalents and 35 U.S.C. Section 112, Paragraph 6 claim interpretation of means plus function claims appended hereto.

What is claimed is:

1. A fingerprint sensing system comprising:
   a sheet prism having
      a sensing surface,
      a plurality of rigid prismlets positioned opposite to the sensing surface,
      each prismlet having an entrance surface and an exit surface,
      each prismlet being adjacent to another prismlet,
      the width of the sheet being more than ten times the maximum thickness of any one of the prismlets;
      such that when a finger is positioned on the sensing surface, a portion of illumination radiation illuminating the system, entering a plurality of the entrance surfaces and incident at the sensing surface is reflected through total internal reflection and emitted from a plurality of the exit surfaces to create an image of the fingerprint.

2. A fingerprint sensing system as recited in claim 1 wherein all of the entrance surfaces of the prismlets have similar orientation, and all of the exit surfaces of the prismlets have similar orientation.

3. A fingerprint sensing system as recited in claim 1 further comprising a transparent substrate to enhance mechanical support for the sheet prism.

4. A fingerprint sensing system as recited in claim 1 wherein for each prismlet,
   the angle subtended by the entrance surface and the exit surface is substantially between 80 and 100 degrees; and
   the entrance surface is about the same dimension as the exit surface.

5. A fingerprint sensing system as recited in claim 4 wherein the angle subtended by the entrance surface and the exit surface is substantially 90 degrees.

6. A fingerprint sensing system as recited in claim 1 wherein substantially the entire sensing surface is illuminated by the illumination radiation.

7. A fingerprint sensing system as recited in claim 1 wherein substantial amount of the total-internally-reflected radiation emits from a number of the exit surfaces to create the image of the fingerprint.

8. A fingerprint sensing system as recited in claim 1 further comprising:
   a detector array; and
   a lens to focus the radiation emitted from a number of exit surfaces to the detector array to form the image.

9. An authentication device comprising a fingerprint sensing system as recited in claim 1.

10. An automatic teller machine comprising a fingerprint sensing system as recited in claim 1 to verify the identity of its user.

11. A recording device comprising a fingerprint sensing system as recited in claim 1 to record the identity of its user.

* * * * *